(12) United States Patent  (10) Patent No.: US 7,092,679 B2
Khorram  (45) Date of Patent: Aug. 15, 2006

(54) LOW LOSS DIVERSITY ANTENNA T/R SWITCH

(75) Inventor: Shahla Khorram, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 423 days.

(21) Appl. No.: 10/727,380

(22) Filed: Dec. 4, 2003

(65) Prior Publication Data

US 2005/0124300 A1    Jun. 9, 2005

(51) Int. Cl.
*H04B 1/44*  (2006.01)
(52) U.S. Cl. ......................... 455/78; 101/272
(58) Field of Classification Search .......... 455/78–83, 455/101, 272; 375/347; 333/100–101
See application file for complete search history.

(56) References Cited

U.S. PATENT DOCUMENTS 5,241,693 A * 8/1993 Kim et al. ..................... 455/82
5,594,394 A * 1/1997 Sasaki et al. ................. 333/103
6,256,495 B1 * 7/2001 Francisco et al. ......... 455/552.1

* cited by examiner

*Primary Examiner*—Nguyen T. Vo
(74) *Attorney, Agent, or Firm*—Garlick Harrison & Markison; Timothy W. Markison (57) ABSTRACT

A low loss transmit/receive switch includes a $1^{st}$ antenna capacitive coupling circuit, a $2^{nd}$ antenna capacitive coupling circuit, an antenna selection circuit, a $1^{st}$ inductive coupling circuit, and a $2^{nd}$ inductive coupling circuit. The $1^{st}$ antenna capacitive coupling circuit is operably coupled to a $1^{st}$ antenna. The $2^{nd}$ antenna capacitive coupling circuit is operably coupled to a $2^{nd}$ antenna. The antenna selection circuit is operably coupled to enable the $1^{st}$ or the $2^{nd}$ antenna in accordance with an antenna selection signal. The $1^{st}$ inductive coupling circuit is operably coupled to the $1^{st}$ and the $2^{nd}$ antenna capacitive coupling circuits and to an output of a power amplifier. The $2^{nd}$ inductive coupling circuit is operably coupled to the $1^{st}$ and the $2^{nd}$ antenna capacitive coupling circuits and to an input of the low noise amplifier.

14 Claims, 5 Drawing Sheets

LOW LOSS DIVERSITY ANTENNA T/R SWITCH

BACKGROUND OF THE INVENTION

1. Technical Field of the Invention

This invention relates generally to wireless communication devices and more particularly to diversity antenna transmit/receive switches.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In many radio frequency (RF) transceivers, the receiver and transmitter operate in a half duplex mode and thus share the antenna. To facilitate the sharing of the antenna, the RF transceiver includes a transmit/receive (T/R) switch, which is off-chip from the transmit and receive sections.

To enhance performance, many RF transceivers use two antennas that are separated by a quarter wave length, half wave length, or full wave length, which is commonly referred to as a diversity antenna. In general, the thought behind diversity antennas is that the antennas, due to their physical separation, will receive incoming RF signals at different signal strengths, the antenna receiving the incoming RF signal at the higher power level is selected for both receiving and transmitting RF signals. To facilitate the sharing of a diversity antenna, the RF transceiver includes at least two off-chip T/R switches.

Recent advances in RF integrated circuit design have focused on incorporating diversity antenna T/R switches on-chip. Such advances have been successful in developing an on-chip diversity antenna T/R switch, but such on-chip diversity antenna T/R switches exhibit about a 4 dBm loss in transmit power. For high power transmit applications, the 4 dBm loss of the on-chip diversity antenna T/R switch is undesirable.

Therefore, a need exists for a low loss on-chip diversity antenna transmit/receive switch.

BRIEF SUMMARY OF THE INVENTION

The low loss transmit/receive switch for diversity antenna radio frequency applications of the present invention substantially meets these needs and others. In one embodiment a low loss transmit/receive switch includes a $1^{st}$ antenna capacitive coupling circuit, a $2^{nd}$ antenna capacitive coupling circuit, an antenna selection circuit, a $1^{st}$ inductive coupling circuit, and a $2^{nd}$ inductive coupling circuit. The $1^{st}$ antenna capacitive coupling circuit is operably coupled to a $1^{st}$ antenna. The $2^{nd}$ antenna capacitive coupling circuit is operably coupled to a $2^{nd}$ antenna. The antenna selection circuit is operably coupled to enable the $1^{st}$ or the $2^{nd}$ antenna in accordance with an antenna selection signal. The $1^{st}$ inductive coupling circuit is operably coupled to the $1^{st}$ and the $2^{nd}$ antenna capacitive coupling circuits and to an output of a power amplifier. The inductance of the $1^{st}$ inductive coupling circuit is tuned with the capacitance of the $1^{st}$ and the $2^{nd}$ antenna capacitive coupling circuits at the corresponding radio frequency of transmitted and/or received RF signals. The $2^{nd}$ inductive coupling circuit is operably coupled to the $1^{st}$ and the $2^{nd}$ antenna capacitive coupling circuits and to an input of the low noise amplifier. The inductance of the $2^{nd}$ inductive coupling circuit is tuned with the capacitance of the $1^{st}$ and $2^{nd}$ antenna capacitive coupling circuits at the corresponding radio frequency. With such an on-chip transmit/receive switch for diversity antennas, power loss during transmission is substantially reduced thereby enhancing the output power of a radio frequency integrated circuit.

In another embodiment, a low loss transmit/receive switch for diversity antenna radio frequency applications includes a $1^{st}$ inductor-capacitor circuit, a $2^{nd}$ inductor-capacitor circuit, a 3$^{rd}$ inductor-capacitor circuit, a 4$^{th}$ inductor-capacitor circuit, a 1$^{st}$ transistor, a 2$^{nd}$ transistor, a 3$^{rd}$ transistor, and a 4$^{th}$ transistor. The first inductor-capacitor circuit has a first node, a center node, and a second node, wherein the first node of the first inductor-capacitor circuit is operably coupled to an input of a low noise amplifier and the second node of the first inductor-capacitor circuit is operably coupled to a first antenna. The second inductor-capacitor circuit has a first node, a center node, and a second node, wherein the first node of the second inductor-capacitor circuit is operably coupled to the input of the low noise amplifier and the second node of the second inductor-capacitor circuit is operably coupled to a second antenna. The third inductor-capacitor circuit has a first node, a center node, and a second node, wherein the first node of the third inductor-capacitor circuit is operably coupled to an output of a power amplifier and the second node of the third inductor-capacitor circuit is operably coupled to the first antenna. The fourth inductor-capacitor circuit has a first node, a center node, and a second node, wherein the first node of the fourth inductor-capacitor circuit is operably coupled to the output of the power amplifier and the second node of the fourth inductor-capacitor circuit is operably coupled to the second antenna. The first transistor has a gate, a drain, and a source, wherein the gate of the first transistor is operably coupled to receive an antenna selection signal, the source of the first transistor is operably coupled to ground, and the drain of the first transistor is operably coupled to the center node of the first inductor-capacitor circuit. The second transistor has a gate, a drain, and a source, wherein the gate of the second transistor is operably coupled to receive the antenna selection signal, the source of the second transistor is operably coupled to the ground, and the drain of the second transistor is operably coupled to the center node of the second inductor-capacitor circuit. The third transistor has a gate, a drain, and a source, wherein the gate of the third transistor is operably coupled to receive the antenna selection signal, the source of the third transistor is operably coupled to ground, and the drain of the third transistor is operably coupled to the center node of the third inductor-capacitor circuit. The fourth transistor has a gate, a drain, and a source, wherein the gate of the fourth transistor is operably coupled to receive the antenna selection signal, the source of the fourth transistor is operably coupled to the ground, and the drain of the fourth transistor is operably coupled to the center node of the fourth inductor-capacitor circuit; wherein, when the antenna selection signal is in a first state, the first and third transistors are enabled and when the antenna selection signal is in a second state, the second and fourth transistors are enabled. With such a low loss on-chip transmit/receive switch, higher transmit powers may be achieved with minimal loss.

DETAILED DESCRIPTION OF THE INVENTION

Figure 1:
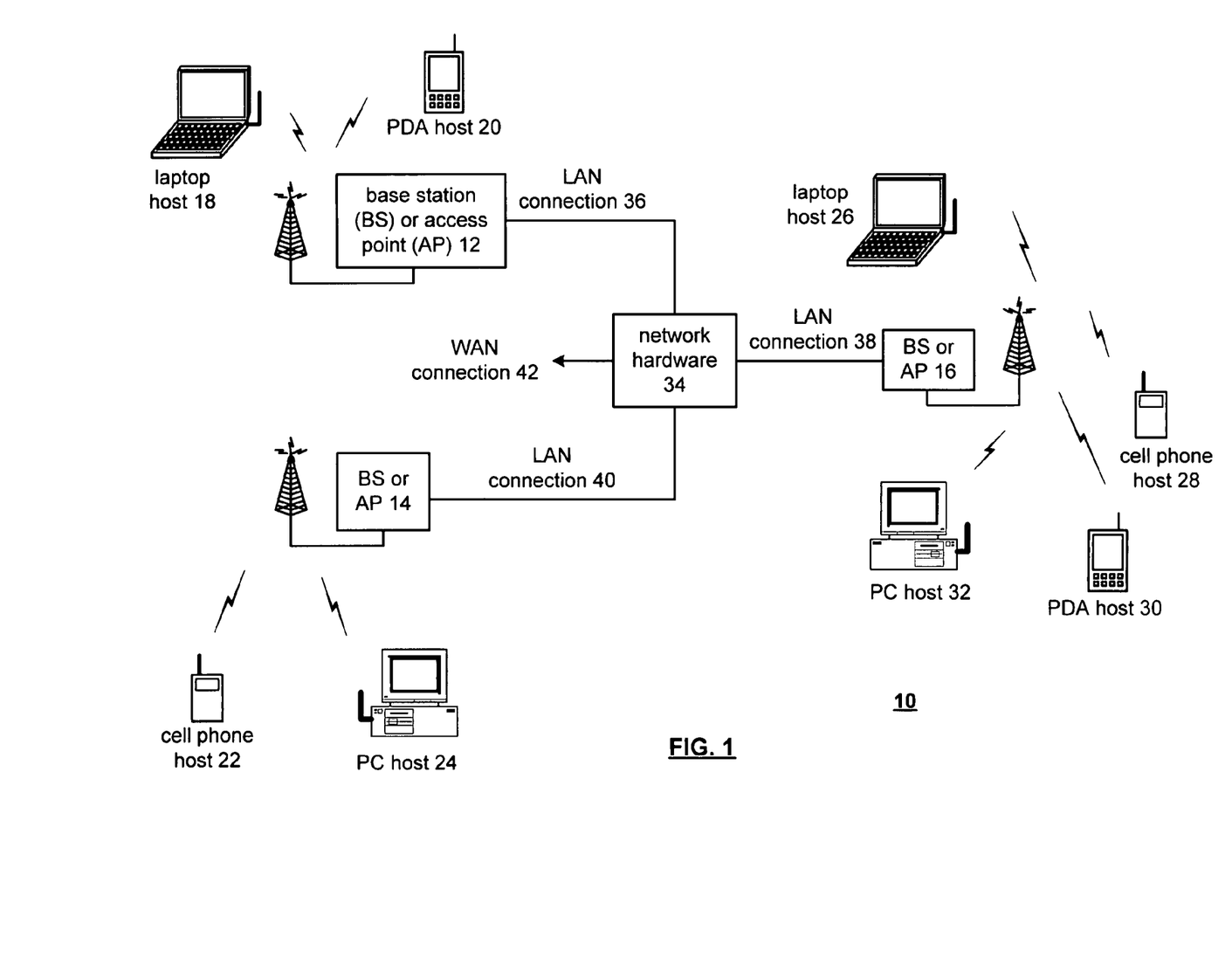
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
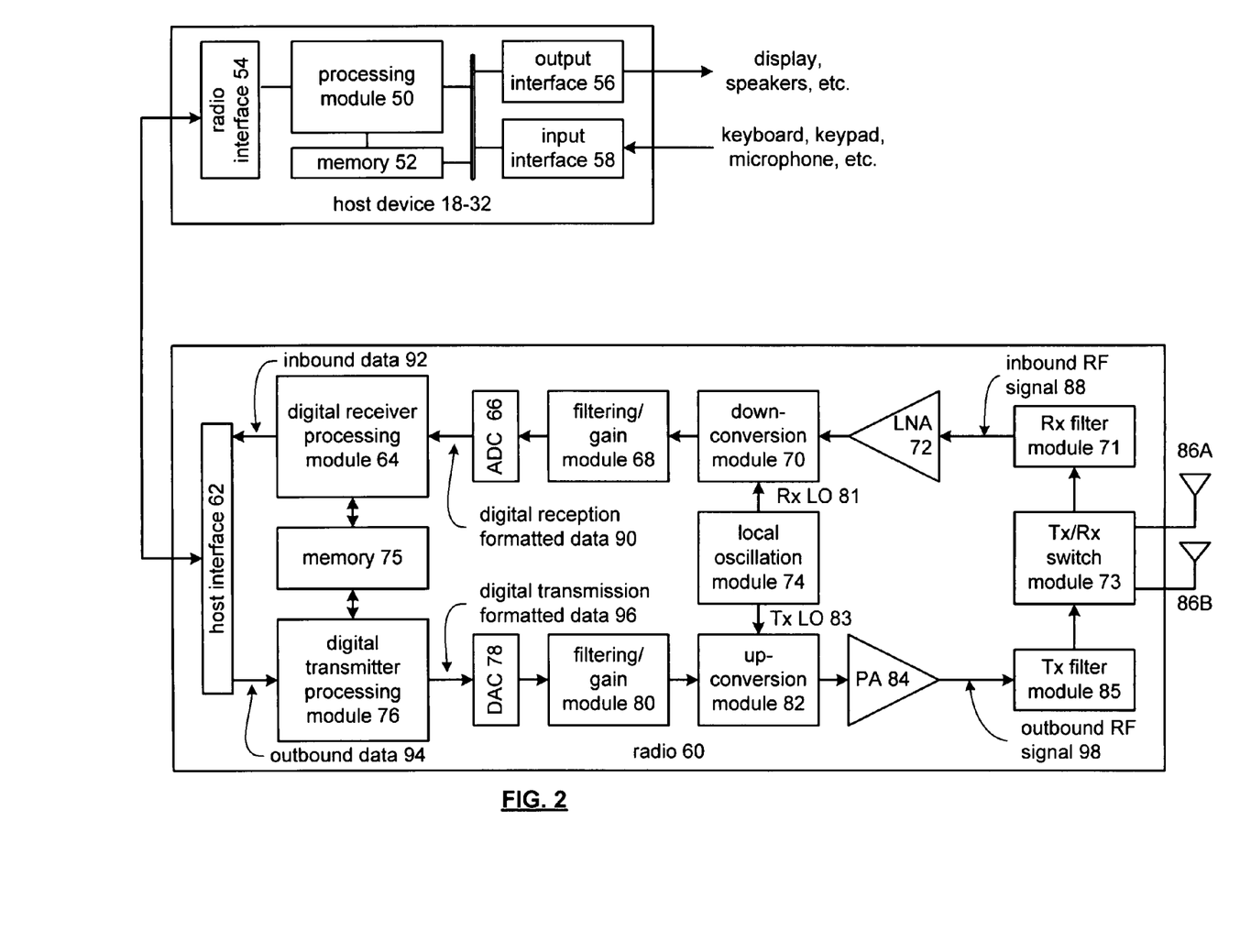
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmit/receive switch 73, a local oscillation module 74, a memory 75, a digital transmitter processing module 76, a digital-to-analog converter 78, a filtering/gain module 80, an IF mixing up conversion stage 82, a power amplifier 84, a transmitter filter module 85, and a diversity antenna 86A and 86B.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The diversity antenna 86A or 86B transmits the outbound RF signal 98 to a targeted device such as a base station, an access point and/or another wireless communication device.

The radio 60 also receives an inbound RF signal 88 via the diversity antenna 86A or 86B, which was transmitted by a base station, an access point, or another wireless communication device. The diversity antenna 86A or 86B provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
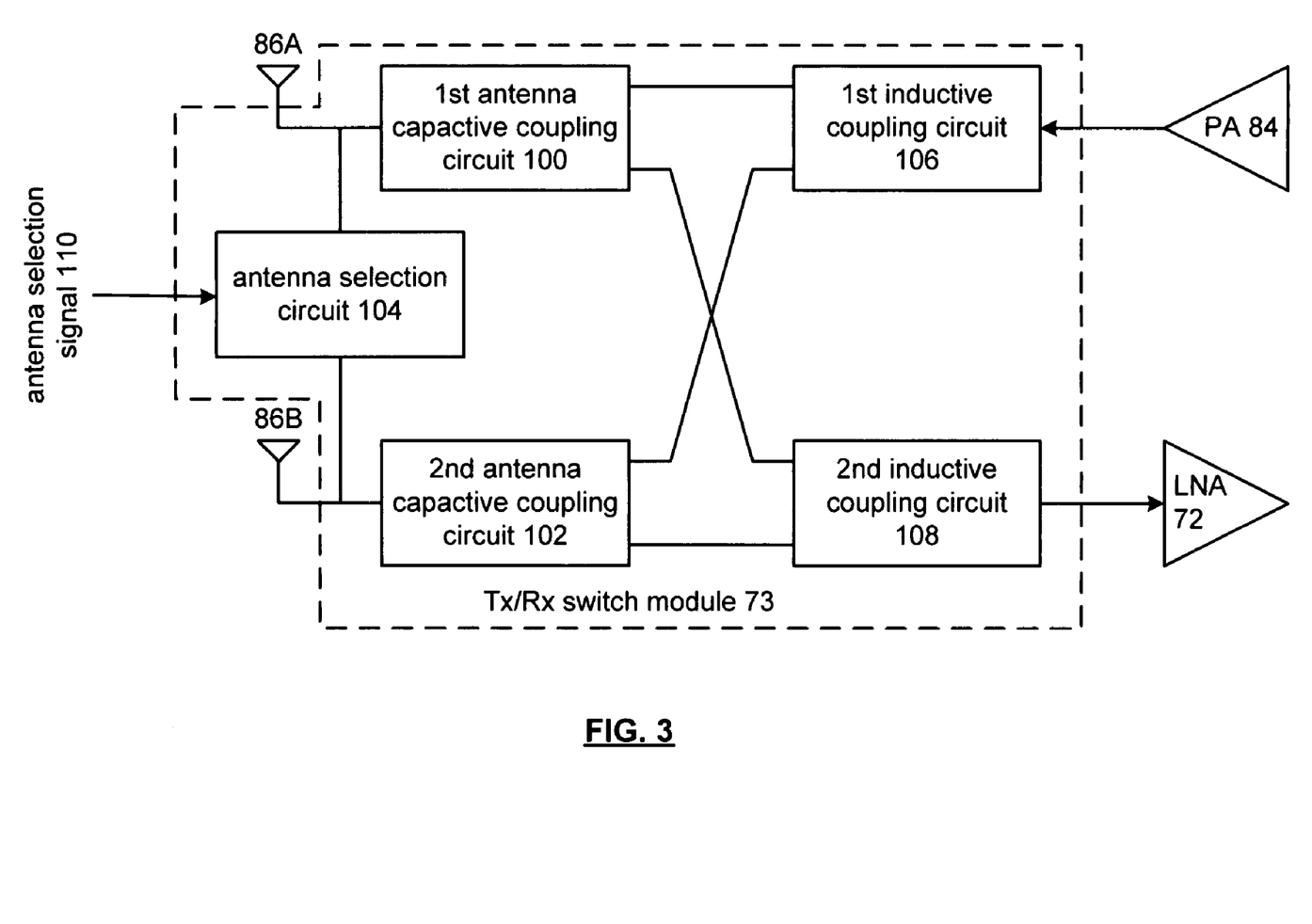
FIG. 3 is a schematic block diagram of a transmit/receive switch in accordance with the present invention.

FIG. 3 is a schematic block diagram of a low loss transmit/receive switch module 73 in accordance with the present invention. The transmit/receive switch module 73 includes a $1^{st}$ antenna capacitive coupling circuit 100, a $2^{nd}$ antenna capacitive coupling circuit 102, an antenna selection circuit 104, a $1^{st}$ inductive coupling circuit 106 and a $2^{nd}$ inductive coupling circuit 108. As shown, the $1^{st}$ antenna capacitive coupling circuit 100 is coupled to a $1^{st}$ antenna 86A while the $2^{nd}$ antenna capacitive coupling circuit 102 is coupled to a $2^{nd}$ antenna 86B. The antenna selection circuit 104 receives an antenna selection signal 110, which indicates whether current RF transmissions or receptions are to use antenna 86A or 86B. The $2^{nd}$ inductive coupling circuit 108 is coupled to an input of the low noise amplifier 72 and the $1^{st}$ inductive coupling circuit 106 is coupled to the output of a power amplifier 84.

In operation, the antenna selection signal 110 will select either antenna 86A or antenna 86B for use during radio frequency reception and transmissions. Such a selection is based on a comparative analysis of received signal strengths between the incoming RF signals received via antenna 86A and 86B. Once the selection is made, antenna selection circuit 104 enables the appropriate antenna. The corresponding antenna capacitive coupling circuit 100 or 102 capacitively couples the selected antenna to the $1^{st}$ inductive coupling circuit 106 and to the $2^{nd}$ inductive coupling circuit 108. Accordingly, when the wireless communication device is transmitting outbound RF signals via the power amplifier 84, the $1^{st}$ inductive coupling circuit 106 receives the outbound RF signals from the power amplifier 84 and provides them to the $1^{st}$ and $2^{nd}$ capacitive coupling circuit 100 and 102. Based on the enabled antenna, the $1^{st}$ or $2^{nd}$ antenna capacitive coupling circuit 100 or 102 provides the amplified RF outbound signals to the appropriate antenna 86A or 86B. Conversely, when inbound RF signals are being received, the activated antenna 86A or 86B provides the incoming RF signals to the $1^{st}$ or $2^{nd}$ antenna capacitive coupling circuit 100 or 102. The $1^{st}$ or $2^{nd}$ antenna capacitive coupling circuit 100 or 102 provides the incoming RF signals to the $2^{nd}$ inductive coupling circuit 100 which in turn provides the signals to the low noise amplifier 72. The capacitance values of the $1^{st}$ and $2^{nd}$ antenna capacitive coupling circuit 100 and 102 and the inductance values of the $1^{st}$ and $2^{nd}$ inductive coupling circuits 106 and 108 are tuned to provide minimal impedance at the frequencies of the RF transmit and receive signals. Accordingly, the loss in transmitting RF signals is minimized due to the minimal impedance of the antenna capacitive coupling circuits 100 and 102 in conjunction with the inductive coupling circuits 106 and 108.

Figure 4:
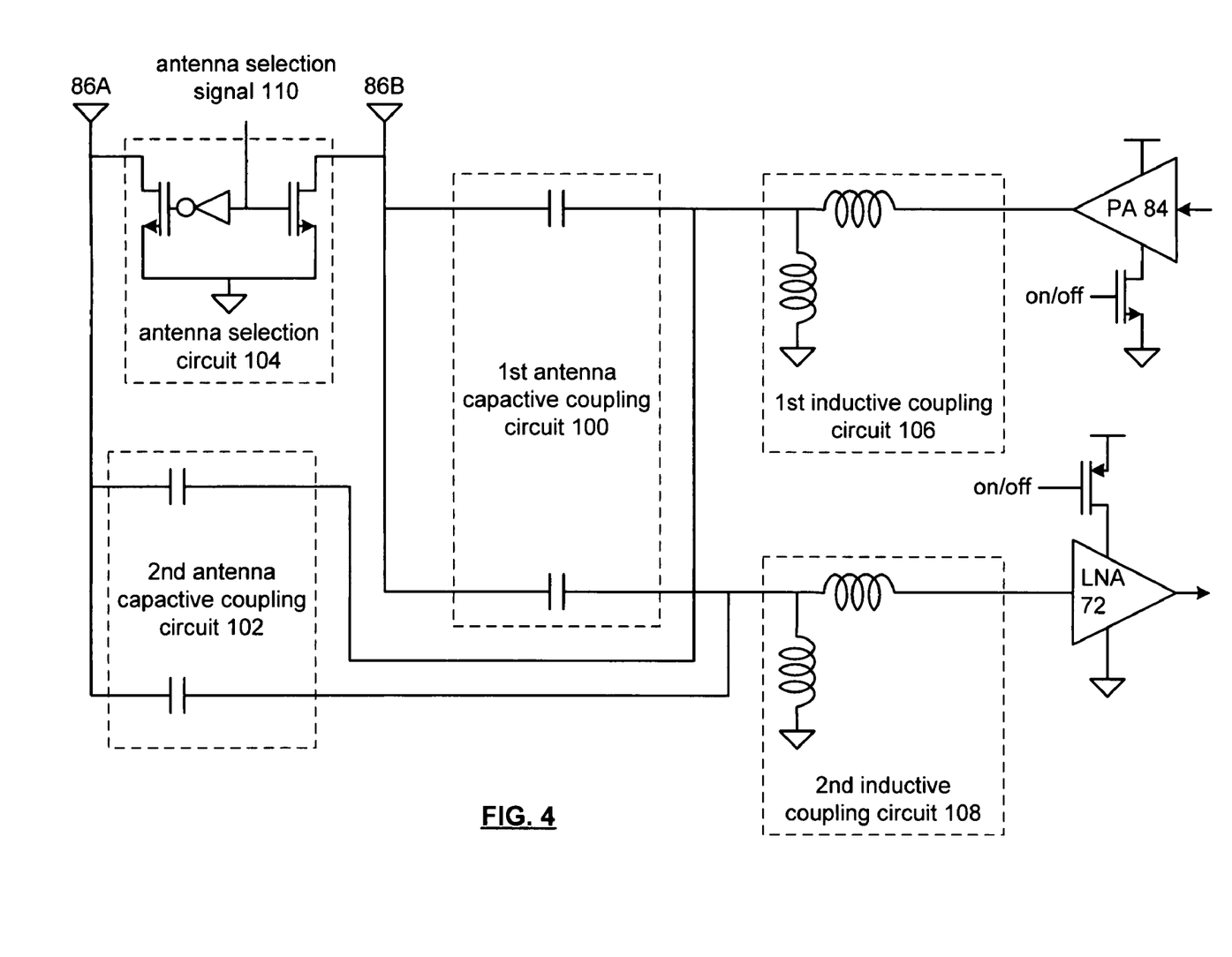
FIG. 4 is a schematic block diagram of another transmit/receive switch in accordance with the present invention.

FIG. 4 is a schematic block diagram of a transmit/receive switch 73 that includes the antenna selection circuit 104, the $1^{st}$ antenna capacitive coupling circuit 100, the $2^{nd}$ antenna capacitive coupling circuit 102, the $1^{st}$ inductive coupling circuit 106, and the $2^{nd}$ inductive coupling circuit 108. In addition, the power amplifier 84 is shown to include an on/off transistor as does the low noise amplifier. In this embodiment, the antenna selection circuit 104 includes two transistors and an inverter. Each of the $1^{st}$ and $2^{nd}$ antenna capacitive coupling circuits 100 and 102 include two capacitors. Each of the $1^{st}$ and $2^{nd}$ inductive coupling circuits 106 and 108 include two inductors.

In operation, based on the antenna selection signal 110, the antenna selection circuit 104 enables one of its N-channel transistors thereby effectively grounding one of the antennas 86A or 86B. The ungrounded antenna 86A or 86B will function as the active antenna for current radio frequency receptions and radio frequency transmissions. For example, assume that antenna 86B is selected as the active antenna, which is coupled to the $1^{st}$ antenna capacitive coupling circuit 100. In this instance, the N-channel transistor coupled to antenna 86A will be on, thereby effectively grounding antenna 86A, while the N-channel transistor coupled to antenna 86B will be off.

Continuing with this example, for radio frequency transmissions, the low noise amplifier 72 is off and the power amplifier is enabled. Accordingly, the power amplifier will provide outbound RF signals to the $1^{st}$ inductive coupling circuit 100 which in turn provides the signals to the $1^{st}$ antenna capacitive coupling circuit 100 such that the outbound RF signals may be transmitted via the antenna 86B. In one embodiment, the capacitors within the $1^{st}$ and $2^{nd}$ antenna capacitive coupling circuit may be 100 femto farads while the inductors are 3 nano-henries within the $1^{st}$ and $2^{nd}$ inductive coupling circuits for RF signals having a carrier frequency of 2.4 GHz to 5.2 GHz.

When the transceiver is in a receive mode, the power amplifier 84 is disabled and the low noise amplifier 72 is enabled. In this configuration, inbound RF signals received via antenna 86B are provided to the $1^{st}$ antenna capacitive coupling circuit 100 which in turn provides the inbound RF signals to the $2^{nd}$ inductive coupling circuit 108, which in turn provides the inbound RF signals to the low noise amplifier 72. The functionality is identical when the other antenna 86A is selected.

Figure 5:
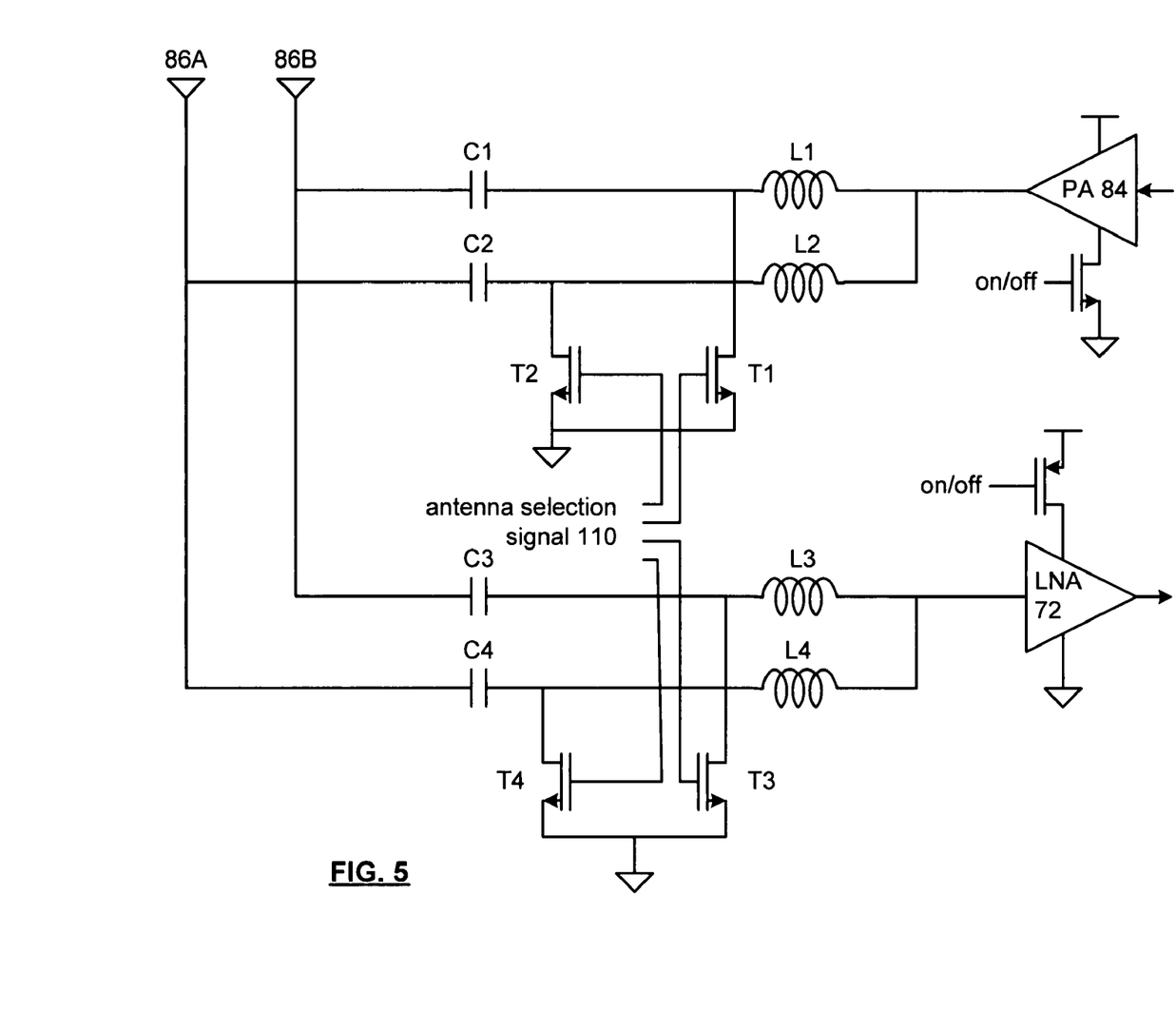
FIG. 5 is a schematic block diagram of another transmit/receive switch in accordance with the present invention.

FIG. 5 is a schematic block diagram of another low loss transmit/receive switch 73 in accordance with the present invention. In this embodiment, the transmit/receive switch 73 includes four capacitors C1–C4, four inductors L1–L4, four transistors T1–T4 and two inverters. The transistors are configured to receive the antenna selection signal 110. The capacitance values of C1–C4 and the inductance values of L1–L4 are tuned to the frequency of the inbound and outbound radio frequencies transmitted via the T/R switch 73. In one example, the capacitors may be 100 femto farads while the inductors are 3 nano-henries.

In operation, the antenna selection signal 110 activates either T1 and T3 or T2 and T4. In one example, when the antenna selection signal 110 is high transistors T1 and T3 are on, thus pulling the common node between C1 and L1 and C3 and L3 to ground, less the impedance provided by T1 and T3. As such, in this example, antenna 86A has been selected such that signals received via antenna 86A are provided via C4 and L4 to LNA 73. During transmit mode, the power amplifier provides the output RF signals via L2 and C2 to antenna 86A. When antenna 86B is to be active, the antenna selection signal 110 is low such that transistors T1 and T3 are off and transistors T2 and T4 are on. With transistors T2 and T4 on, the connection between capacitors C2 and L2 and the connection between capacitors C4 and L4 is effectively grounded. Thus, for outbound RF signals the power amplifier 84 transmits via inductor L1 and capacitor C1 and for inbound RF signals the LNA 72 receives theses signals via C3 and L3.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a low loss on-chip transmit/receive switch for diversity antenna radio frequency applications. By implementing a low loss T/R switch, output transmit power can be increased with minimal power loss. As one of average skill in the art will appreciate, other embodiments may be derived from the teaching of the present invention without deviating from the scope of the claims.

What is claimed is:

1. A low loss transmit/receive switch for diversity antenna radio frequency applications, the low loss transmit/receive switch comprises:
   first antenna capacitive coupling circuit operably coupled to a first antenna;
   second antenna capacitive coupling circuit operably coupled to a second antenna;
   antenna selection circuit operably coupled to enable the first or the second antenna in accordance with an antenna selection signal;
   first inductive coupling circuit operably coupled to the first and second antenna capacitive coupling circuits and to an output of a power amplifier, wherein inductance of the first inductive coupling circuit is tuned with capacitance of the first and second antenna capacitive coupling circuits at a corresponding radio frequency; and
   second inductive coupling circuit operably coupled to the first and second antenna capacitive coupling circuits and to an input of a low noise amplifier, wherein inductance of the second inductive coupling circuit is tuned with the capacitance of the first and second antenna capacitive coupling circuits at the corresponding radio frequency.

2. The low loss transmit/receive switch of claim 1, wherein the first inductive coupling circuit comprises:
   first inductor having a first node and a second node, wherein the first node of the first inductor is operably coupled to receive a single-ended radio frequency signal from the output of the power amplifier; and
   second inductor having a first node and a second node, wherein the first node of the second inductor is operably coupled to the second node of the first inductor, wherein the second node of the second inductor is operably coupled to ground, and wherein the operable coupling of the first node of the second inductor to the second node of the first inductor is operably coupled to the first and second antenna capacitive coupling circuits.

3. The low loss transmit/receive switch of claim 1, wherein the second inductive coupling circuit comprises:
   first inductor having a first node and a second node, wherein the first node of the first inductor is operably coupled to provide a single-ended radio frequency signal to the input of the low noise amplifier; and
   second inductor having a first node and a second node, wherein the first node of the second inductor is operably coupled to the second node of the first inductor, wherein the second node of the second inductor is operably coupled to ground, and wherein the operable coupling of the first node of the second inductor to the second node of the first inductor is operably coupled to the first and second antenna capacitive coupling circuits.

4. The low loss transmit/receive switch of claim 1, wherein each of the first and second antenna capacitive coupling circuits comprises:
   a first capacitor having a first node and a second node, wherein the first node of the first capacitor is operably coupled to the first or second inductive coupling circuit, respectively; wherein the second node of the first capacitor is operably coupled to the first antenna; and
   a second capacitor having a first node and a second node, wherein the first node of the second capacitor is operably coupled to the first or second inductive coupling circuit, respectively; wherein the second node of the second capacitor is operably coupled to the second antenna.

5. The low loss transmit/receive switch of claim 1, wherein the antenna selection circuit comprises:
   a first transistor having a gate, a drain, and a source, wherein the gate of the first transistor is operably coupled to receive the antenna selection signal, the source of the first transistor is operably coupled to the ground, and the drain of the first transistor is operably coupled to the first antenna; and
   a second transistor having a gate, a drain, and a source, wherein the gate of the second transistor is operably coupled to receive the antenna selection signal, the source of the second transistor is operably coupled to the ground, and the drain of the second transistor is operably coupled to the second antenna, wherein, when the antenna selection signal is in a first state, the first transistor is enabled and when the antenna selection signal is in a second state, the second transistor is enabled.

6. A low loss transmit/receive switch for diversity antenna radio frequency applications, the low loss transmit/receive switch comprises:
   a first inductor-capacitor circuit having a first node, a center node, and a second node, wherein the first node of the first inductor-capacitor circuit is operably coupled to an input of a low noise amplifier and the second node of the first inductor-capacitor circuit is operably coupled to a first antenna;
   a second inductor-capacitor circuit having a first node, a center node, and a second node, wherein the first node of the second inductor-capacitor circuit is operably coupled to the input of the low noise amplifier and the second node of the second inductor-capacitor circuit is operably coupled to a second antenna;
   a third inductor-capacitor circuit having a first node, a center node, and a second node, wherein the first node of the third inductor-capacitor circuit is operably coupled to an output of a power amplifier and the second node of the third inductor-capacitor circuit is operably coupled to the first antenna;
   a fourth inductor-capacitor circuit having a first node, a center node, and a second node, wherein the first node of the fourth inductor-capacitor circuit is operably coupled to the output of the power amplifier and the second node of the fourth inductor-capacitor circuit is operably coupled to the second antenna;
   a first transistor having a gate, a drain, and a source, wherein the gate of the first transistor is operably coupled to receive an antenna selection signal, the source of the first transistor is operably coupled to ground, and the drain of the first transistor is operably coupled to the center node of the first inductor-capacitor circuit;
   a second transistor having a gate, a drain, and a source, wherein the gate of the second transistor is operably coupled to receive the antenna selection signal, the source of the second transistor is operably coupled to the ground, and the drain of the second transistor is operably coupled to the center node of the second inductor-capacitor circuit;
   a third transistor having a gate, a drain, and a source, wherein the gate of the third transistor is operably coupled to receive the antenna selection signal, the source of the third transistor is operably coupled to ground, and the drain of the third transistor is operably coupled to the center node of the third inductor-capacitor circuit;

a fourth transistor having a gate, a drain, and a source, wherein the gate of the fourth transistor is operably coupled to receive the antenna selection signal, the source of the fourth transistor is operably coupled to the ground, and the drain of the fourth transistor is operably coupled to the center node of the fourth inductor-capacitor circuit; wherein, when the antenna selection signal is in a first state, the first and third transistors are enabled and when the antenna selection signal is in a second state, the second and fourth transistors are enabled.

7. The low loss transmit/receive switch of claim 6, wherein each of the first, second, third, and fourth inductor-capacitor circuits comprises:

an inductor having an inductance value of approximately three nano-Henries; and a capacitor having a capacitance value of approximately one pico-Farad.

8. A radio frequency integrated circuit (RFIC) comprises:

a receiver section operably coupled to convert inbound radio frequency (RF) signals into inbound baseband data, wherein the receiver section includes a low noise amplifier for receiving the inbound RF signal;

a transmitter section operably coupled to convert outbound baseband signals into outbound RF signals, wherein the transmitter section includes a power amplifier for transmitting the outbound RF signals; and low loss transmit/receive switch operably coupled to the low noise amplifier and the power amplifier, wherein the low loss transmit/receive switch includes:

first antenna capacitive coupling circuit operably coupled to a first antenna;

second antenna capacitive coupling circuit operably coupled to a second antenna;

antenna selection circuit operably coupled to enable the first or the second antenna in accordance with an antenna selection signal;

first inductive coupling circuit operably coupled to the first and second antenna capacitive coupling circuits and to an output of the power amplifier, wherein inductance of the first inductive coupling circuit is tuned with capacitance of the first and second antenna capacitive coupling circuits at a corresponding radio frequency of the inbound and outbound RF signals; and second inductive coupling circuit operably coupled to the first and second antenna capacitive coupling circuits and to an input of the low noise amplifier, wherein inductance of the second inductive coupling circuit is tuned with the capacitance of the first and second antenna capacitive coupling circuits at the corresponding radio frequency.

9. The RFIC of claim 8, wherein the first inductive coupling circuit comprises:

first inductor having a first node and a second node, wherein the first node of the first inductor is operably coupled to receive a single-ended radio frequency signal from the output of the power amplifier; and second inductor having a first node and a second node, wherein the first node of the second inductor is operably coupled to the second node of the first inductor, wherein the second node of the second inductor is operably coupled to ground, and wherein the operable coupling of the first node of the second inductor to the second node of the first inductor is operably coupled to the first and second antenna capacitive coupling circuits.

10. The RFIC of claim 8, wherein the second inductive coupling circuit comprises:

first inductor having a first node and a second node, wherein the first node of the first inductor is operably coupled to provide a single-ended radio frequency signal to the input of the low noise amplifier; and second inductor having a first node and a second node, wherein the first node of the second inductor is operably coupled to the second node of the first inductor, wherein the second node of the second inductor is operably coupled to ground, and wherein the operable coupling of the first node of the second inductor to the second node of the first inductor is operably coupled to the first and second antenna capacitive coupling circuits.

11. The RFIC of claim 8, wherein each of the first and second antenna capacitive coupling circuits comprises:

a first capacitor having a first node and a second node, wherein the first node of the first capacitor is operably coupled to the first or second inductive coupling circuit, respectively; wherein the second node of the first capacitor is operably coupled to the first antenna; and a second capacitor having a first node and a second node, wherein the first node of the second capacitor is operably coupled to the first or second inductive coupling circuit, respectively; wherein the second node of the second capacitor is operably coupled to the second antenna.

12. The RFIC of claim 8, wherein the antenna selection circuit comprises:

a first transistor having a gate, a drain, and a source, wherein the gate of the first transistor is operably coupled to receive the antenna selection signal, the source of the first transistor is operably coupled to the ground, and the drain of the first transistor is operably coupled to the first antenna; and a second transistor having a gate, a drain, and a source, wherein the gate of the second transistor is operably coupled to receive the antenna selection signal, the source of the second transistor is operably coupled to the ground, and the drain of the second transistor is operably coupled to the second antenna, wherein, when the antenna selection signal is in a first state, the first transistor is enabled and when the antenna selection signal is in a second state, the second transistor is enabled.

13. A radio frequency integrated circuit (RFIC) comprises:

a receiver section operably coupled to convert inbound radio frequency (RF) signals into inbound baseband data, wherein the receiver section includes a low noise amplifier for receiving the inbound RF signal;

a transmitter section operably coupled to convert outbound baseband signals into outbound RF signals, wherein the transmitter section includes a power amplifier for transmitting the outbound RF signals; and low loss transmit/receive switch operably coupled to the low noise amplifier and the power amplifier, wherein the low loss transmit/receive switch includes:

a first inductor-capacitor circuit having a first node, a center node, and a second node, wherein the first node of the first inductor-capacitor circuit is operably coupled to an input of the low noise amplifier and the second node of the first inductor-capacitor circuit is operably coupled to a first antenna;

a second inductor-capacitor circuit having a first node, a center node, and a second node, wherein the first node of the second inductor-capacitor circuit is operably coupled to the input of the low noise amplifier and the second node of the second inductor-capacitor circuit is operably coupled to a second antenna;

a third inductor-capacitor circuit having a first node, a center node, and a second node, wherein the first node of the third inductor-capacitor circuit is operably coupled to an output of the power amplifier and the second node of the third inductor-capacitor circuit is operably coupled to the first antenna;

a fourth inductor-capacitor circuit having a first node, a center node, and a second node, wherein the first node of the fourth inductor-capacitor circuit is operably coupled to the output of the power amplifier and the second node of the fourth inductor-capacitor circuit is operably coupled to the second antenna;

a first transistor having a gate, a drain, and a source, wherein the gate of the first transistor is operably coupled to receive an antenna selection signal, the source of the first transistor is operably coupled to ground, and the drain of the first transistor is operably coupled to the center node of the first inductor-capacitor circuit;

a second transistor having a gate, a drain, and a source, wherein the gate of the second transistor is operably coupled to receive the antenna selection signal, the source of the second transistor is operably coupled to the ground, and the drain of the second transistor is operably coupled to the center node of the second inductor-capacitor circuit;

a third transistor having a gate, a drain, and a source, wherein the gate of the third transistor is operably coupled to receive the antenna selection signal, the source of the third transistor is operably coupled to ground, and the drain of the third transistor is operably coupled to the center node of the third inductor-capacitor circuit;

a fourth transistor having a gate, a drain, and a source, wherein the gate of the fourth transistor is operably coupled to receive the antenna selection signal, the source of the fourth transistor is operably coupled to the ground, and the drain of the fourth transistor is operably coupled to the center node of the fourth inductor-capacitor circuit; wherein, when the antenna selection signal is in a first state, the first and third transistors are enabled and when the antenna selection signal is in a second state, the second and fourth transistors are enabled.

14. The RFIC of claim 13, wherein each of the first, second, third, and fourth inductor-capacitor circuits comprises:

an inductor having an inductance value of approximately three nano-Henries; and a capacitor having a capacitance value of approximately one pico-Farad.

* * * * *